(12) United States Patent
Sheldon et al.

(10) Patent No.: US 11,611,693 B1
(45) Date of Patent: Mar. 21, 2023

(54) UPDATING LENS FOCUS CALIBRATION VALUES

(71) Applicant: Motorola Mobility LLC, Chicago, IL (US)

(72) Inventors: Cole P. Sheldon, Grayslake, IL (US); Zetong Gu, Claredon Hills, IL (US); Corey Wood, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/538,393

(22) Filed: Nov. 30, 2021

(51) Int. Cl.
*H04N 5/232* (2006.01)
*H04N 5/225* (2006.01)

(52) U.S. Cl.
CPC ..... *H04N 5/232123* (2018.08); *H04N 5/2252* (2013.01)

(58) Field of Classification Search
CPC .......... H04N 5/232123; H04N 5/2252; H04N 17/002; H04N 5/23212; G03B 13/18; G03B 13/20
See application file for complete search history.

(56) References Cited

U.S. PATENT DOCUMENTS

| | | | |
|---|---|---|---|
| 6,864,474 B2 | 3/2005 | Misawa | |
| 7,609,958 B2 | 10/2009 | Border et al. | |
| 10,560,690 B2 * | 2/2020 | Malaescu | H04N 17/002 |
| 2010/0040355 A1 * | 2/2010 | Craen | A61B 1/0019 396/90 |
| 2013/0135517 A1 * | 5/2013 | Lee | H04N 5/23212 348/345 |
| 2015/0130987 A1 * | 5/2015 | Nakagawa | H04N 5/232123 348/349 |
| 2018/0349378 A1 * | 12/2018 | Galor Gluskin | H04N 5/232122 |

FOREIGN PATENT DOCUMENTS

EP 1351086 A2 * 10/2003 ............ G02B 7/28

* cited by examiner

*Primary Examiner* — Timothy J Henn
(74) *Attorney, Agent, or Firm* — FIG. 1 Patents (57) ABSTRACT

A camera system lens or image sensor is moved to change the distance between the image sensor the lens in order for the image sensor to capture an-focus of an object. The camera system includes one or more calibration values indicating distances between the lens and the image sensor for different distances to objects, such as a macro calibration value and an infinity calibration value. These one or more calibration values are used by the camera system when manually focusing the camera system (e.g., a user manually sets the camera system to a macro setting or an infinity setting) or when automatically focusing the camera system on an object. These one or more calibration values are dynamically updated during use of the camera system, allowing the camera system to adapt to various factors such as changes in environment, pressure applied to the camera system, and so forth.

20 Claims, 6 Drawing Sheets

UPDATING LENS FOCUS CALIBRATION VALUES

BACKGROUND

As technology has advanced our uses for computing devices have expanded. One such use is digital photography with camera systems being found in a wide variety of different devices, such as smartphones. While these camera systems provide many benefits by allowing users to take pictures in many different settings, they are not without their problems. One such problem is that various different factors can alter how well a camera system operates, such as aging of components in the camera system, temperature of the camera system, pressure applied when constructing a device that includes a camera system, and so forth. These problems can be frustrating for users, leading to user frustration with their camera systems and devices including camera systems.

BRIEF DESCRIPTION OF THE DRAWINGS

Embodiments of updating lens focus calibration values are described with reference to the following drawings. The same numbers are used throughout the drawings to reference like features and components.

DETAILED DESCRIPTION

Updating lens focus calibration values is discussed herein. Generally, a camera system lens or image sensor is moved to change the distance between the image sensor and the lens in order for the image sensor to capture an in-focus image of an object. The camera system includes one or more calibration values indicating distances between the lens and an image sensor for different distances to objects, such as a macro calibration value for objects 10 centimeters from the lens and an infinity calibration value for objects 10 meters from the lens. These one or more calibration values are used by the camera system when manually focusing the camera system (e.g., a user manually sets the camera system to a macro setting or an infinity setting) as well as when automatically focusing the camera system on an object. These one or more calibration values are dynamically updated during use of the camera system, allowing the camera system to adapt to various factors such as changes in environment, pressure applied to the camera system, and so forth.

More specifically, for each of multiple images captured by the camera system, a set of data points is collected. This set of data points includes an indication of a distance from the lens of the camera system to an object being captured in the image and an indication of a location of the lens of the camera system relative to the image sensor of the camera system (e.g., an actuator setting or code number). A scatter plot is generated from the sets of data points, plotting actuator code number against the reciprocal of the object distance. A linear curve fitting the scatter plot is generated and one or more calibration values are determined from the linear curve. Various calibration values are determined, such as a macro calibration value for objects 10 centimeters from the lens and an infinity calibration value for objects 10 meters from the lens. The determined calibration values are compared to corresponding stored calibration values (e.g., previously generated and stored macro and infinity calibration values). If the determined calibration values differ from the corresponding stored calibration values by at least a threshold amount, the stored calibration values are replaced with the determined calibration values.

The techniques discussed herein improve the operation of a camera system or a device including a camera system by updating the calibration values of the camera system over time. The calibration values for the camera system can be initially set by a supplier after manufacturing the camera system. However, various factors can change the actual positions of the actuator that correspond to different calibration distances, such as for macro and infinity distances. These factors include actuator aging, changes in temperature, pressure applied to the computing device or camera system during assembly or production of the computing device, and so forth. By dynamically updating the calibration values, the camera system accounts for these various factors, allowing manual focusing of the camera system to be more accurate, allowing autofocusing of the camera system (which oftentimes relies on calibration values, such as the macro and infinity distances when performing autofocusing) to be performed more quickly, and so forth.

Figure 1:
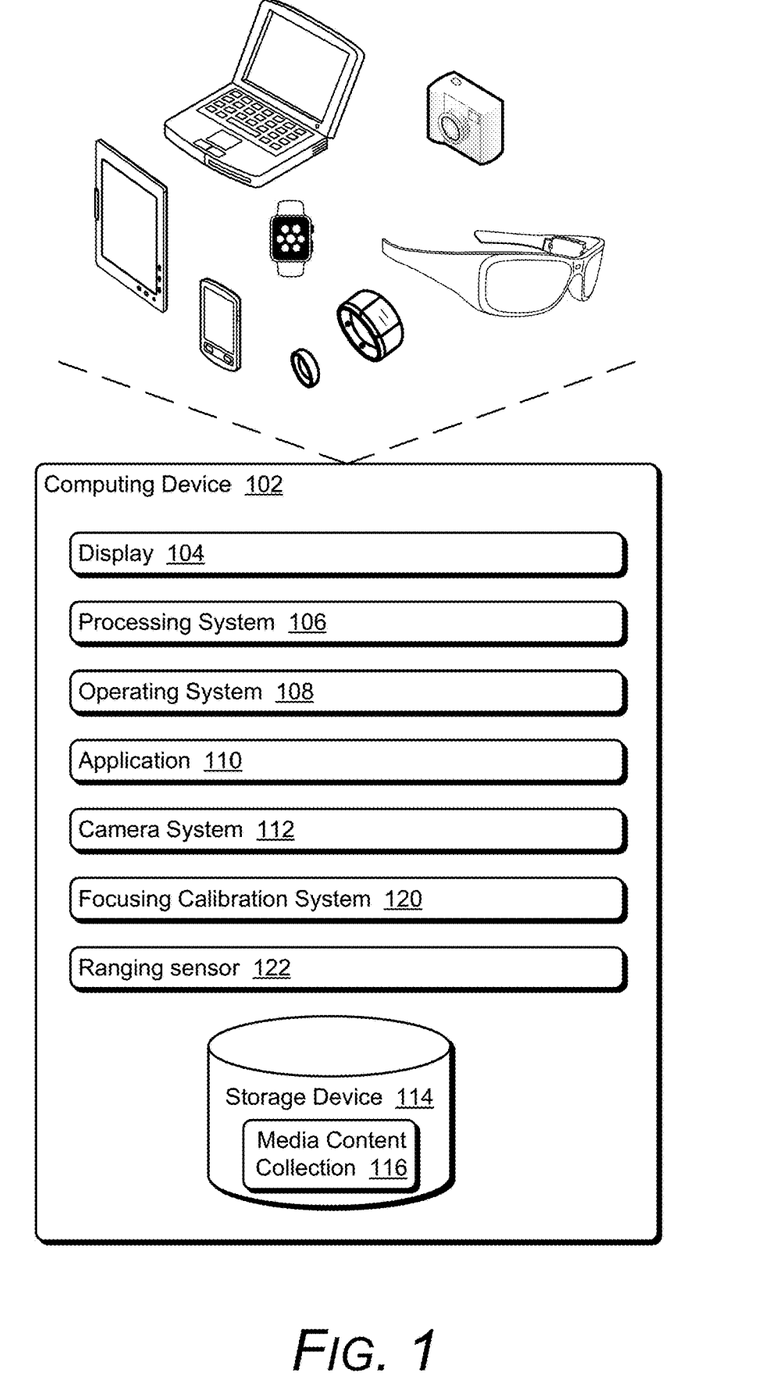
FIG. 1 illustrates an example computing device implementing the techniques discussed herein.

FIG. 1 illustrates an example computing device 102 implementing the techniques discussed herein. The computing device 102 can be, or include, many different types of computing or electronic devices. For example, the computing device 102 can be a smartphone or other wireless phone, a camera (e.g., compact or point-and-shoot), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device), a video camera, an Internet of Things (IoT) device, an automotive computer, and so forth.

The computing device 102 includes a display 104. The display 104 can be configured as any suitable type of display, such as an organic light-emitting diode (OLED) display, active matrix OLED display, liquid crystal display (LCD), in-plane shifting LCD, projector, and so forth. Although illustrated as part of the computing device 102, it should be noted that the display 104 can be implemented separately from the computing device 102. In such situations, the computing device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. The display 104 can also optionally operate as an input device (e.g., the display 104 can be a touchscreen display).

The computing device 102 also includes a processing system 106 that includes one or more processors, each of which can include one or more cores. The processing system 106 is coupled with, and may implement functionalities of, any other components or modules of the computing device 102 that are described herein. In one or more embodiments, the processing system 106 includes a single processor having a single core. Alternatively, the processing system 106 includes a single processor having multiple cores or multiple processors (each having one or more cores).

The computing device 102 also includes an operating system 108. The operating system 108 manages hardware, software, and firmware resources in the computing device 102. The operating system 108 manages one or more applications 110 running on the computing device 102 and operates as an interface between applications 110 and hardware components of the computing device 102.

The computing device 102 also includes a camera system 112. The camera system 112 captures images digitally using any of a variety of different technologies, such as a charge-coupled device (CCD) sensor, a complementary metal-oxide-semiconductor (CMOS) sensor, combinations thereof, and so forth. The camera system 112 can include a single sensor and lens, or alternatively multiple sensors or multiple lenses. For example, the camera system 112 may have at least one lens and sensor positioned to capture images from the front of the computing device 102 (e.g., the same surface as the display is positioned on), and at least one additional lens and sensor positioned to capture images from the back of the computing device 102.

The camera system 112 can capture still images as well as video. The media content discussed herein refers to one or both of still images and video. The captured images or video can be store stored in a storage device 114 as a media content collection 116. The storage device 114 can be implemented using any of a variety of storage technologies, such as magnetic disk, optical disc, Flash or other solid state memory, and so forth.

The computing device 102 also includes a focusing calibration system 120, which can be implemented in a variety of different manners. For example, the focusing calibration system 120 can be implemented as multiple instructions stored on computer-readable storage media and that can be executed by the processing system 106. Additionally or alternatively, the focusing calibration system 120 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). Furthermore, although illustrated as separate from the operating system 108, the focusing calibration system 120 can be implemented at least in part as part of the operating system 108.

Generally, the camera system 112 includes an image sensor and a lens. One or both of the image sensor and the lens is moved to change the distance between the image sensor and the lens in order for the image sensor to capture an in-focus image of an object. The camera system 112 includes one or more calibration values indicating distances between the lens and the image sensor for different distances to objects, such as a macro calibration value for objects 10 centimeters from the lens and an infinity calibration value for objects 10 meters from the lens. These one or more calibration values are used by the camera system 112 when manually focusing the camera system 112 (e.g., a user manually sets the camera system to a macro setting or an infinity setting) or when automatically focusing the camera system 112 on an object. The focusing calibration system 120 dynamically updates these one or more calibration values during use of the camera system 112, allowing the camera system 112 to adapt to various factors such as changes in environment, pressure applied to the camera system 112, and so forth.

The computing device 102 also includes a ranging sensor 122. The ranging sensor 122 is any of a variety of different ranging devices or sensors that determines the distance between the computing device 102 (e.g., the ranging sensor 122) and another object. For example, the ranging sensor 122 can be a time-of-flight sensor, a depth camera, phase detection autofocus sensors, and so forth.

Figure 2:
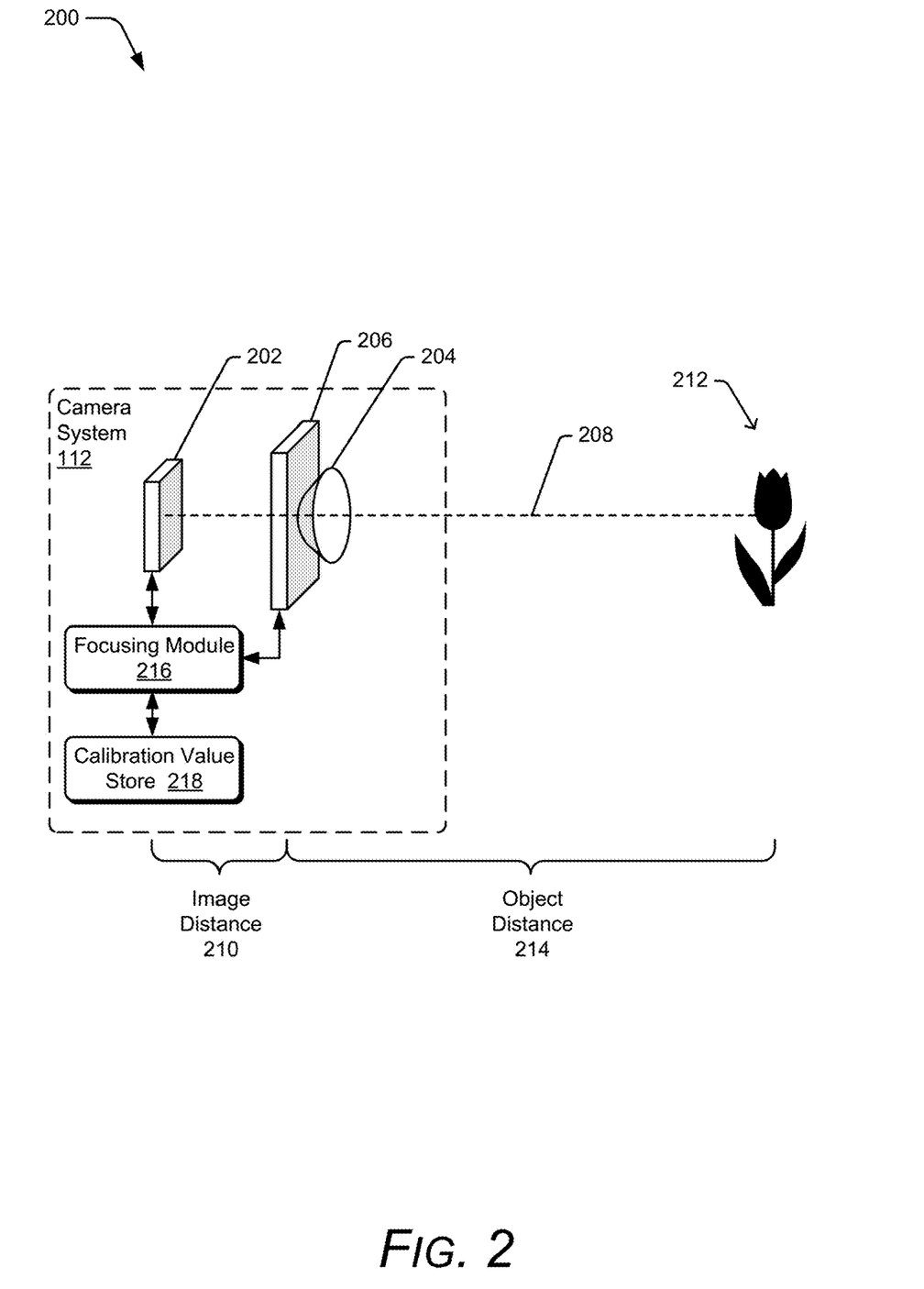
FIG. 2 illustrates an example including a camera system.

FIG. 2 illustrates an example 200 including a camera system 112. The camera system 112 includes an image sensor 202, a lens 204, and an actuator 206 (e.g., a voice coil motor (VCM)) that moves the lens 204 (along a line 208) within the camera system 112 to change the distance between the image sensor 202 and the lens 204. The distance between the image sensor 202 and the lens 204 is illustrated as image distance 210 and the distance between the lens 204 and an object 212 (illustrated as a flower) is illustrated as object distance 214. Changing the distance between the image sensor 202 and the lens 204 allows an image of the object 212 to be in-focus on the image sensor 202, allowing an in-focus image of the object 212 to be captured by the image sensor 202.

The camera system 112 includes a focusing module 216 that implements functionality to determine a distance between the image sensor 202 and the lens 204 that results in the image sensor 202 being able to capture an in-focus image of the object 212. This distance between the image sensor 202 and the lens 204 can vary based on the distance between the lens 204 and the object 212. The focusing module 216 can use any of a variety of different public or proprietary techniques to determine the appropriate distance between the image sensor 202 and the lens 204 that results in the image sensor 202 being able to capture an in-focus image of the object 212. Although illustrated as part of the camera system 112, additionally or alternatively the focusing module 216 is implemented in another module or system, such as the operating system 108 or an application 110.

The focusing module 216 retrieves and uses calibration values maintained in a calibration value store 218. Although illustrated as being part of the camera system 112, additionally or alternatively the calibration value store 218 is maintained elsewhere, such as in a store of the operating system 108 or an application 110, in the storage device 114, and so forth. The calibration values in the store 218 are values (e.g., VCM codes) indicating settings of the actuator 206, each setting indicating a different distance between the image sensor 202 and the lens 204. For example, the actuator 206 can support 1024 different settings, so each possible setting value for the actuator 206 is a value between 0 and 1023 (e.g., with 0 being the closest distance the lens 204 can be moved to the image sensor 202 and 1023 being the farthest distance the lens 204 can be moved away from the image sensor 202).

The calibration values in the calibration value store 218 are initially set after manufacture of the camera system 112, typically prior to inclusion of the camera system 112 in another device such as computing device 102. In one or more implementations, the calibration values are initially calculated by placing an object (e.g. a chart) a known distance from the lens 204 and having focusing module 216 determine the proper setting of actuator 206 so that the image sensor 202 captures an in-focus image of the object. The determined setting of actuator 206 is stored in the calibration value store 218 as a calibration value corresponding to the particular known distance. For example, the calibration value store 218 can store a calibration value corresponding to a macro distance (e.g., 10 centimeters from the lens 204 to the object) and an infinity distance (e.g., 10 meters from the lens 204 to the object). Additionally or alternatively, the calibration value store 218 can store one or more other calibration values, such as a calibration value corresponding to a super macro (e.g., 1 centimeter from the lens 204 to the object).

It should be noted that when determining the proper setting of actuator 206, the distance from the lens 204 may change slightly due to movement of the actuator 206. However, the known distance to the object is treated as the same—once the object is placed at the known distance the object need not and typically is not moved when determining the proper setting of actuator 206.

The calibration values in the calibration value store 218 are used by the focusing module 216 in various modes, such as a manual focus mode. In the manual focus mode the user of the computing device 102 indicates a particular focus setting, such as a macro setting or an infinity setting. In response to the user-indicated focus setting, the focusing module 216 sets the actuator 206 to the setting indicated by the corresponding calibration value in the calibration value store 218 (e.g., the calibration value corresponding to the macro setting or the infinity setting). As discussed in more detail below, the techniques discussed herein dynamically update the calibration values in the calibration value store 218, allowing the focusing module 216 to have calibration values for particular settings (e.g., a macro setting and an infinity setting) to allow an in-focus image to be captured by the image sensor 202 despite various factors that can affect the appropriate values for those settings, such as changes in environment, pressure applied to the camera system, and so forth.

Additionally or alternatively, the calibration values in the calibration value store 218 are used by the focusing module 216 in an auto focus mode. In an auto focus mode the focusing module 216 can use any of a variety of different public or proprietary techniques to automatically determine the appropriate distance between the image sensor 202 and the lens 204 (and thus the appropriate setting for the actuator 206) that results in the image sensor 202 being able to capture an in-focus image of the object 212. These auto focus techniques oftentimes rely on calibration values corresponding to the macro setting or the infinity setting when performing autofocusing. As discussed in more detail below, the techniques discussed herein dynamically update the calibration values in the calibration value store 218, allowing the focusing module 216 to have accurate calibration values for particular settings (e.g., a macro setting and an infinity setting) that allow auto focusing to be performed more quickly despite various factors that can affect the appropriate values for those settings, such as changes in environment, pressure applied to the camera system, and so forth.

Figure 3:
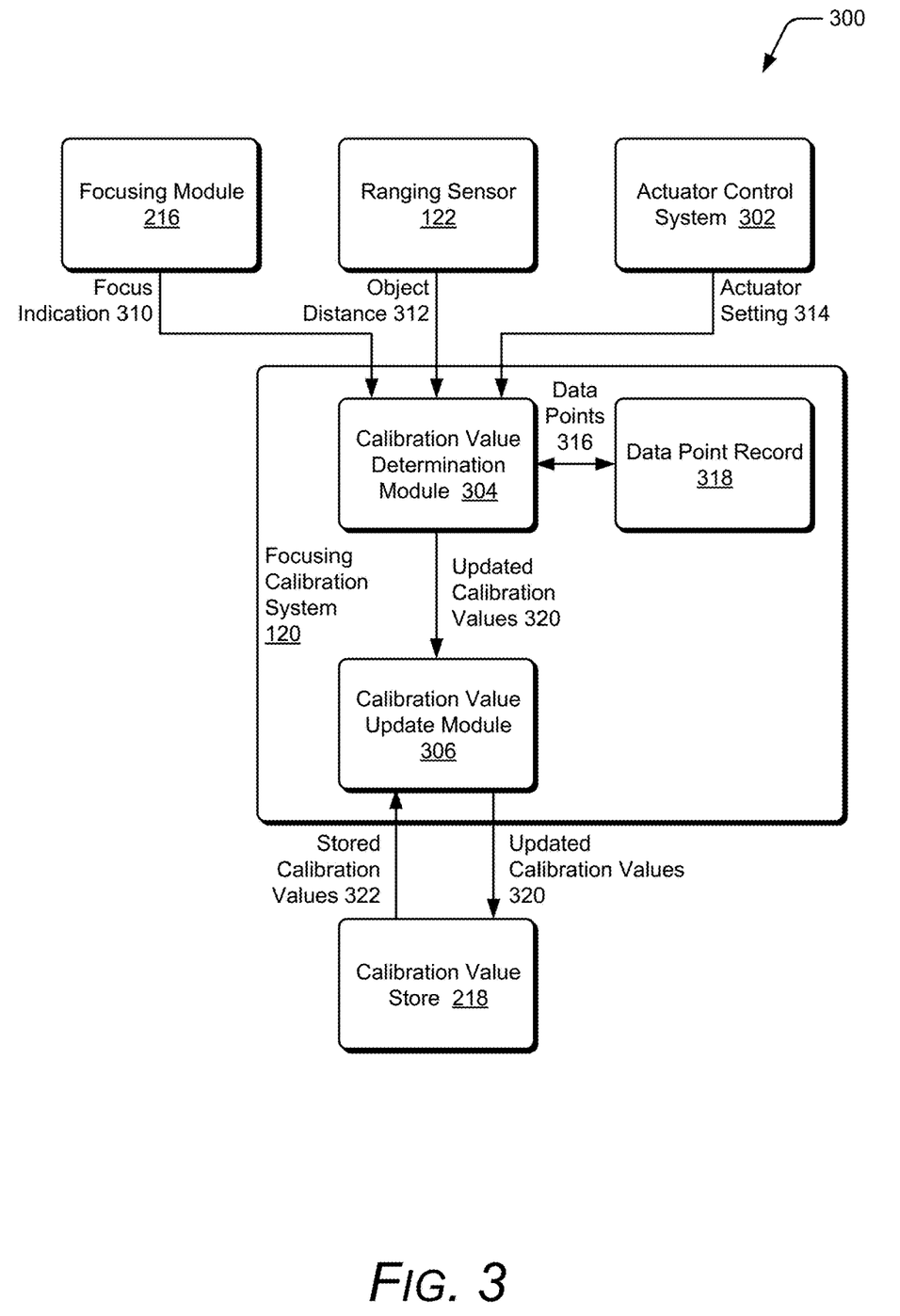
FIG. 3 illustrates an example of a system implementing the techniques discussed herein.

FIG. 3 illustrates an example 300 of a system implementing the techniques discussed herein. In the example 300, the focusing calibration system 120, the ranging sensor 122, the focusing module 216, the calibration value store 218, and an actuator control system 302 are illustrated. The focusing calibration system 120 includes a calibration value determination module 304 and a calibration value update module 306. It should be noted that the object distance 312 is used by the focusing calibration system 120 and in one or more implementations need not be used by or provided to the focusing module 216.

The calibration value determination module 304 receives a focus indication 310 from the focusing module 216 indicating that an object is in focus. The calibration value determination module 304 also receives an object distance 312 from the ranging sensor 122 indicating a distance to the object (e.g., from the ranging sensor 122) and an actuator setting 314 from the actuator control system 302 indicating a current setting for the actuator (e.g., the actuator 206 of FIG. 2). Accordingly, when an object is in focus (as indicated by the focus indication 310), the calibration value determination module 304 knows both the distance to the object (as indicated by the object distance 312) and the current setting for the actuator (as indicated by the actuator setting 314).

The calibration value determination module 304 can receive the object distance 312 and the actuator setting 314 at various times. In one or more implementations, the calibration value determination module 304 receives the object distance 312 and the actuator setting 314 in response to an object being in focus, such as by requesting the object distance 312 and the actuator setting 314 from the ranging sensor 122 and the actuator control system 302, accessing registers or storage locations where the ranging sensor 122 stores the object distance 312 and the actuator control system 302 stores the actuator setting 314, automatically in response to the ranging sensor 122 and the actuator control system 302 receiving the focus indication 310, and so forth. Additionally or alternatively, the calibration value determination module 304 receives the object distance 312 and the actuator setting 314 on a regular basis and uses, as the object distance and the actuator setting for an object in focus, the most recently received object distance 312 and the actuator setting 314 after receiving the focus indication 310.

Each time an object is in focus (as indicated by the focus indication 310), the calibration value determination module 304 stores a set of data points 316 that includes the object distance 312 and the actuator setting 314. These sets of data points 316 are stored in a data point record 318. Accordingly, each time an object is focused on, the distance to the object and the actuator setting that resulted in the object being in focused is stored the data point record 318. These sets of data points are stored each time an object is in focus regardless of whether an image of the object is captured and stored, is displayed to preview the image, and so forth. Similarly, these sets of data points can be stored for video with each frame of the video treated as an image.

Although the calibration value determination module 304 is discussed herein as storing a set of data points 316 each time an object is in focus, additionally or alternatively, the calibration value determination module 304 stores a set of data points 316 only a portion of the times an object is in focus. For example, the calibration value determination module can store a set of data points 316 after a threshold amount of time (e.g., half a second or one second) elapses since the last set of data points 316 was stored, storing a set of data points 316 after a threshold number of focus indications 310 (e.g., five or ten focus indications 310) have been received from the focusing module 216, and so forth.

The calibration value determination module 304 analyzes the data points 316 to determine one or more lens focus calibration values for an object distance from the lens of the camera system 112 to the object. These one or more calibration values are for one or more of the object distances corresponding to calibration values stored in the calibration value store 218, such as a macro distance and an infinity distance. The calibration value determination module 304 determines the one or more lens focus calibration values at any of a variety of intervals or in response to any of a variety of events, such as in response to receipt of a focus indication 310, after a threshold number (e.g., 10 or 20) new sets of data points 316 are added to the data point record 318, after a threshold amount of time (e.g., 10 seconds or 30 seconds) has elapsed since the one or more lens focus calibration values were previously generated, and so forth.

To generate the one or more lens focus calibration values, the calibration value determination module 304 uses the fact that there is a linear relationship between the actuator setting and the reciprocal of the object distance. Accordingly, for each set of data points in the data point record 318, the calibration value determination module 304 determines the reciprocal of the object distance. Additionally or alternatively, the reciprocal of the object distance can be stored in the data point record 318 (e.g., in place of the object distance). Given the multiple pairs of data points (actuator setting and reciprocal of the object distance), the calibration value determination module 304 determines a linear curve fitting the multiple pairs of data points. Any of a variety of public or proprietary techniques can be used to determine the linear curve fitting the multiple pairs of data points.

Figure 4:
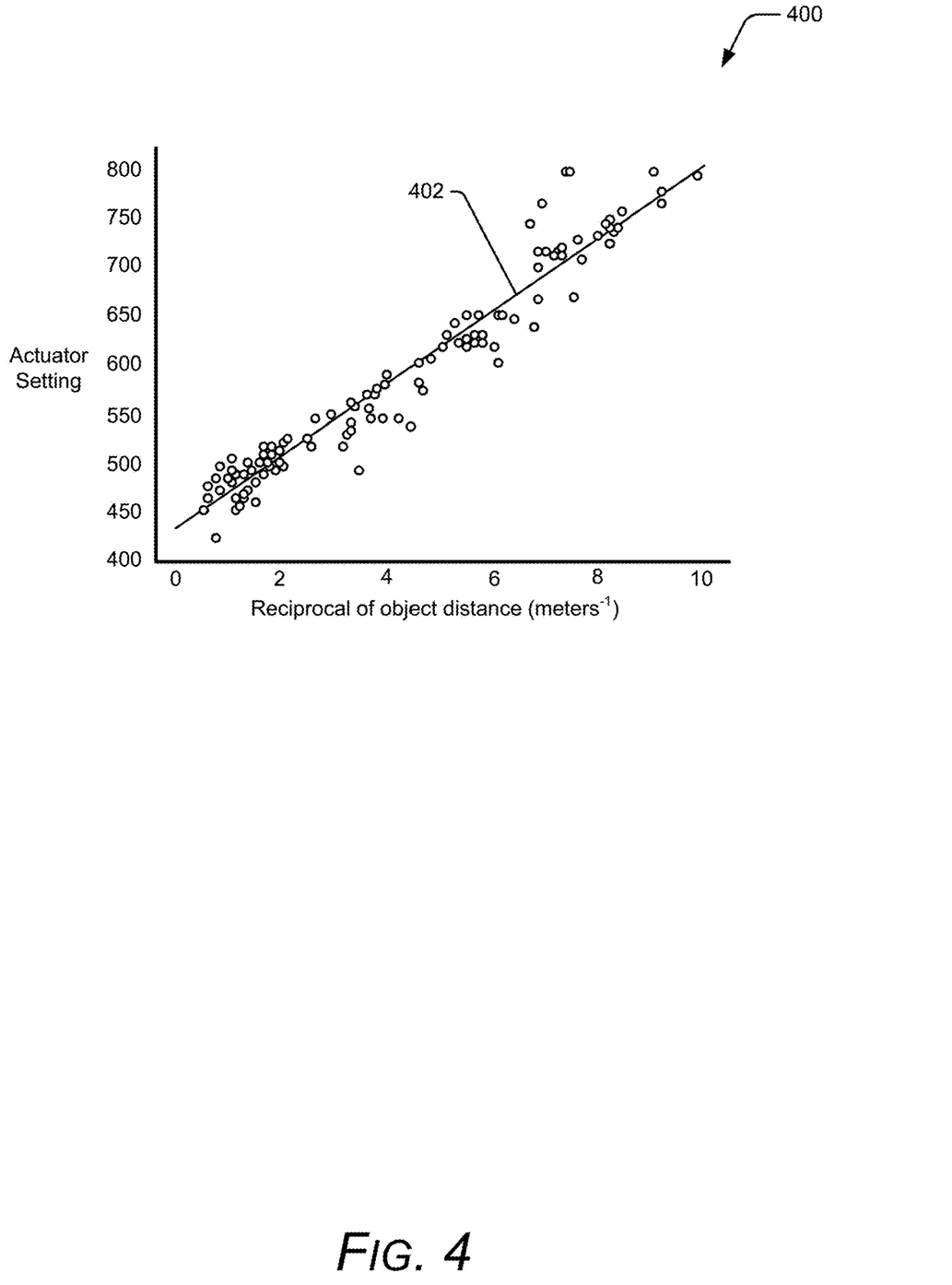
FIG. 4 illustrates an example scatter plot of multiple pairs of data points.

FIG. 4 illustrates an example scatter plot 400 of multiple pairs of data points. This scatter plot 400 is generated, for example, by the calibration value determination module 304. The scatter plot 400 illustrates multiple actuator setting values along the y-axis (ranging from 400 to 800) and multiple object distance reciprocals along the x-axis (ranging from 0 to 10 meters$^{-1}$). The scatter plot 400 assumes that the infinity distance is 10 meters. Multiple dots are illustrated in the scatter plot 400, each representing an actuator setting and object distance reciprocal pair. A linear curve 402 fitting the multiple pairs of data points is also illustrated.

Given the linear curve 402, calibration value determination module 304 can readily determine the actuator setting for any of various different object distances. The calibration value determination module 304 determines, as a lens focus calibration value, the actuator setting for the corresponding distance. For example, assume that the linear curve 402 is determined to be y=37.0986x+431.3881. The calibration value determination module 304 determines the lens focus calibration value for a distance of 10 centimeters (a macro distance) to be y=37.0986(0.1)+431.3881=435.09796, rounded to 435. Similarly, the calibration value determination module 304 determines the lens focus calibration value for a distance of 10 meters (an infinity distance) to be y=37.0986(10)+431.3881=802.3741, rounded to 802.

Returning to FIG. 3, the calibration value determination module 304 provides the determined lens focus calibration values to the calibration value update module 306 as updated calibration values 320. The calibration value update module 306 retrieves the stored calibration values 322 from the calibration value store 218 and compares the stored calibration values 322 to the updated calibration values 320 and determines whether the stored calibration values 322 differ from the updated calibration values 320 by a threshold amount. This threshold amount can be a fixed amount (e.g., 50 or 60) or a variable amount (e.g., 20% of the stored calibration value, 20% of the updated calibration value, etc.). If the calibration value update module 306 determines that the stored calibration values 322 differ from the updated calibration values 320 by the threshold amount, the calibration value update module stores the updated calibration values 320 in the calibration value store 218. The updated calibration values 320 replace the previously stored calibration values (e.g., the previously stored calibration values are overwritten with the updated calibration values 320).

The calibration value update module 306 can store all of the updated calibration values 320 in the calibration value store 218 or only a subset of the updated calibration values 320 in the calibration value store. For example, if the updated calibration values 320 include calibration values for macro and infinity distances, if the stored calibration value 322 for the macro distance differs from the updated calibration value 320 for the macro distance by the threshold amount, or the stored calibration value 322 for the infinity distance differs from the updated calibration value 320 for the infinity distance by the threshold amount, the updated calibration values 320 for both the macro distance and the infinity distance are stored in the calibration value store 218.

By way of another example, the updated calibration values 320 for both the macro distance and the infinity distance may be stored in the calibration value store 218 only if the stored calibration value 322 for the macro distance differs from the updated calibration value 320 for the macro distance by the threshold amount and the stored calibration value 322 for the infinity distance differs from the updated calibration value 320 for the infinity distance by the threshold amount.

By way of another example, only the updated calibration value that differs from the updated calibration value by the threshold amount is stored in the calibration value store 218. E.g., if the stored calibration value 322 for the macro distance differs from the updated calibration value 320 for the macro distance by the threshold amount, but the stored calibration value 322 for the infinity distance does not differ from the updated calibration value 320 for the infinity distance by the threshold amount, the updated calibration value 320 for the macro distance is stored in the calibration value store 218 but the updated calibration value for the infinity distance is not stored in the calibration value store 218.

Thus, in response to various factors such as pressure applied to the computing device 102 or the camera system 112, changes in the temperature of the camera system 112, or aging of the camera system 112, the actuator settings used to generate an in-focus object are changed. This results in different sets of data points 316 being generated and thus different linear curves being generated based on these various factors. As the linear curve fitting the data points changes, the lens focus calibration values also change to accommodate the various factors.

In one or more implementations, the calibration value determination module 304 clears (deletes) the data point record 318 at various intervals or in response to various events. For example, the calibration value determination module 304 can clear the data point record 318 daily or weekly. By way of another example, the calibration value determination module 304 can clear the data point record 318 in response to events such as a change in external temperature (e.g., as detected by a temperature sensor of the computing device 102) by a threshold amount over a threshold amount of time (e.g., 20 or 30 degrees over the course of a minute, such as if the computing device 102 is moved indoors or outside).

In one or more implementations, the focusing calibration system 120 is running whenever the camera system 112 is powered on and is capturing images for storage or is displaying previews of the image. Additionally or alternatively, the focusing calibration system 120 runs when triggered by one or more other events, such as detecting of a change in external temperature (e.g., as detected by a temperature sensor of the computing device 102) by a threshold amount over a threshold amount of time (e.g., 20 or 30 degrees over the course of a minute, such as if the computing device 102 is moved indoors or outside).

Figure 5:
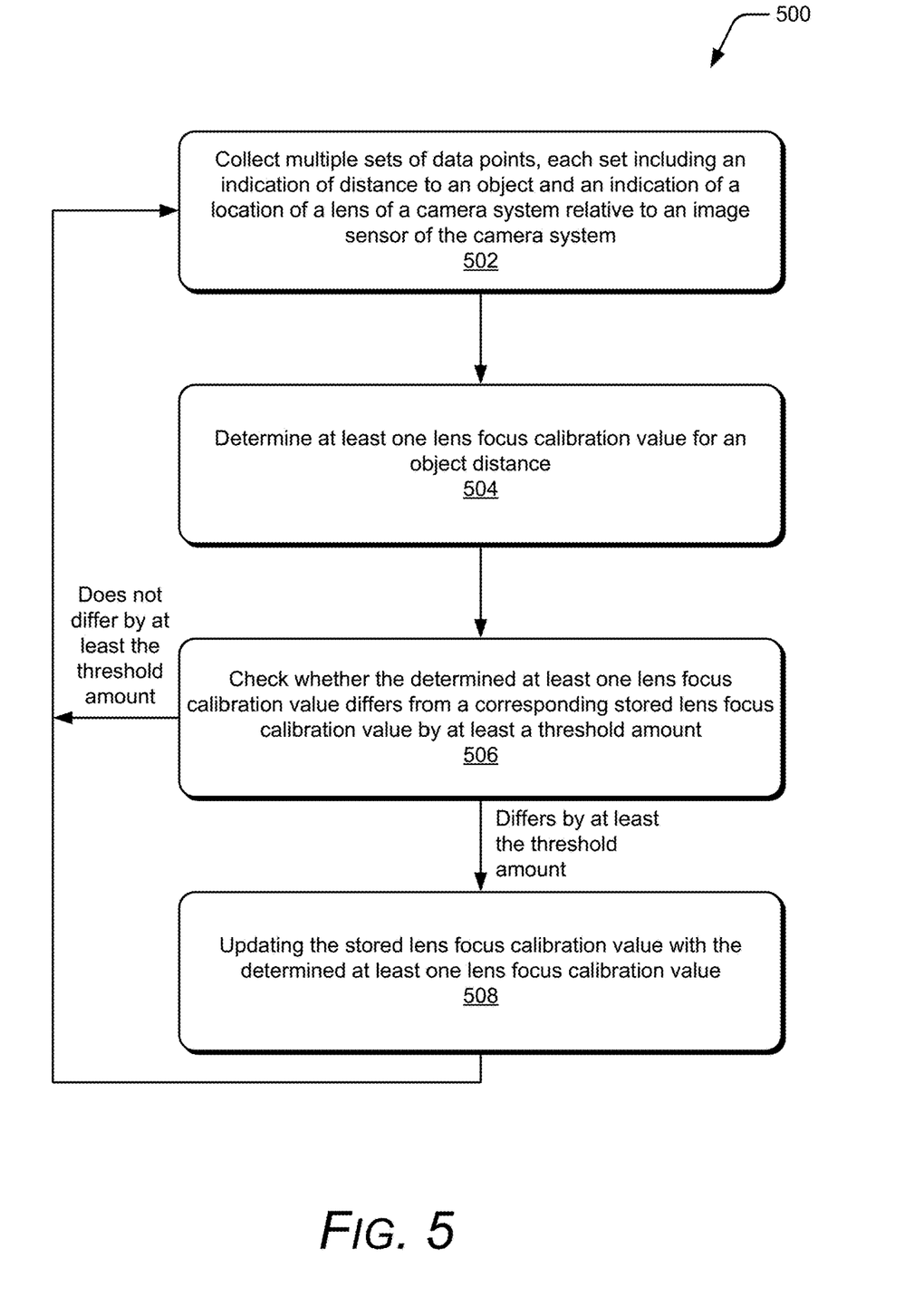
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by a focusing calibration system, such as focusing calibration system 120 of FIG. 1 or FIG. 3, and can be implemented in software, firmware, hardware, or combinations thereof. Process 500 is shown as a set of acts and is not limited to the order shown for performing the operations of the various acts.

In process 500, multiple sets of data points are collected (act 502). Each set of data points includes an indication of a distance from a lens of a camera system to an object and an indication of a location of the lens of the camera system relative to an image sensor of the camera system.

At least one lens focus calibration value is determined for an object distance (act 504). These object distances are, for example, a macro distance (e.g., 10 centimeters) and an infinity distance (e.g., 10 meters).

A check is made as to whether the determined at least one lens focus calibration value differs from a corresponding stored lens focus calibration value by at least a threshold amount (act 506).

The process 500 proceeds based on the check in act 506. If the determined at least one lens focus calibration value differs from a corresponding stored lens focus calibration value by at least a threshold amount, the stored lens focus calibration value is updated (e.g., replaced) with the determined at least one calibration value (act 508). The process 500 then returns to continue collecting sets of data points. However, if the determined at least one lens focus calibration value does not differ from a corresponding stored lens focus calibration value by at least a threshold amount, the process 500 returns, without replacing the stored lens focus calibration value, to continue collecting sets of data points.

Figure 6:
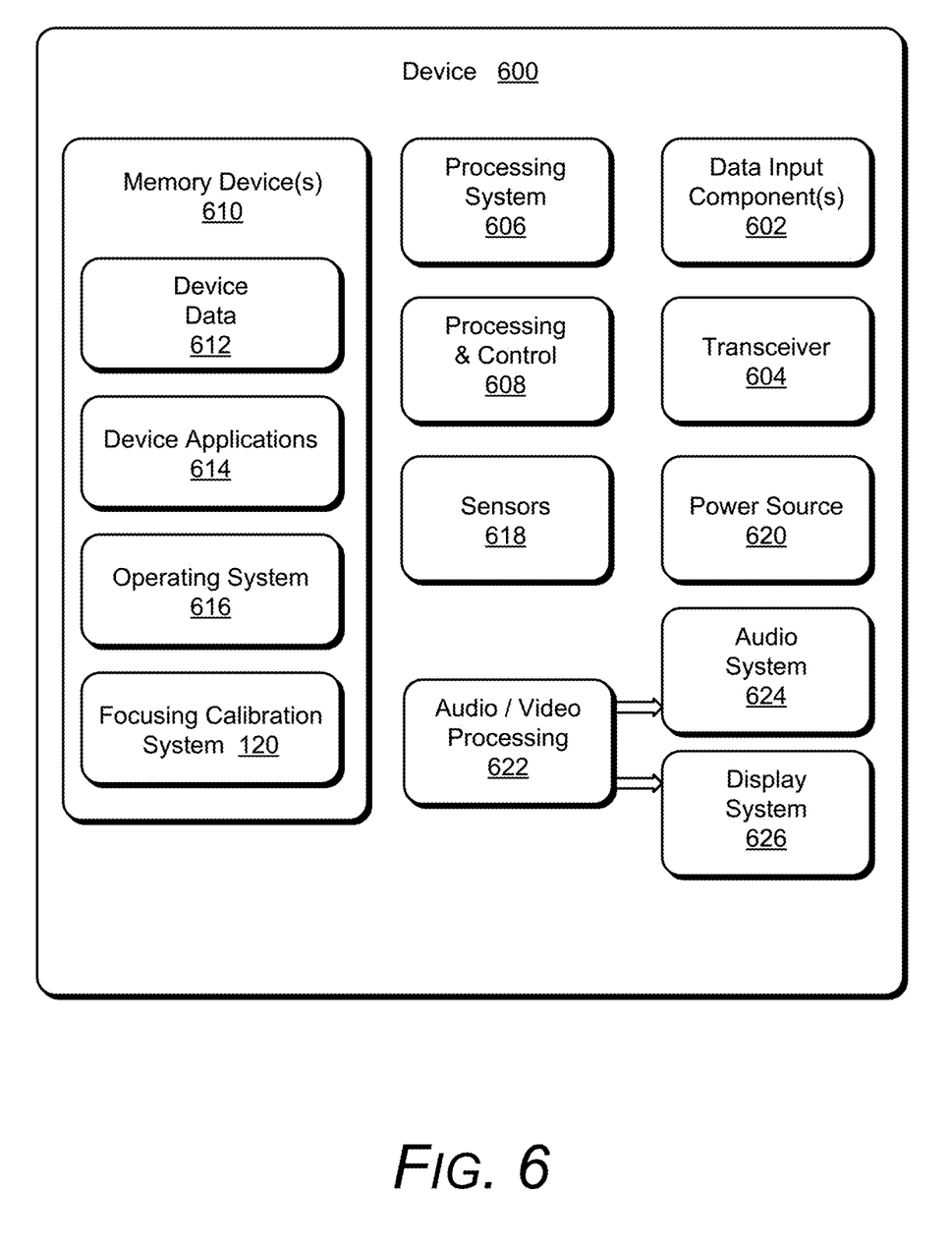
FIG. 6 illustrates various components of an example electronic device that can implement embodiments of the techniques discussed herein.

FIG. 6 illustrates various components of an example electronic device that can implement embodiments of the techniques discussed herein. The electronic device 600 can be implemented as any of the devices described with reference to the previous FIGS., such as any type of client device, mobile phone, tablet, computing, communication, entertainment, gaming, media playback, or other type of electronic device. In one or more embodiments the electronic device 600 the focusing calibration system 120, described above.

The electronic device 600 includes one or more data input components 602 via which any type of data, media content, or inputs can be received such as user-selectable inputs, messages, music, television content, recorded video content, and any other type of text, audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, touchscreens, keyboards, and so forth.

The device 600 includes communication transceivers 604 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 600 includes a processing system 606 of one or more processors (e.g., any of microprocessors, controllers, and the like) or a processor and memory system implemented as a system-on-chip (SoC) that processes computer-executable instructions. The processing system 606 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 608. The device 600 may further include any type of a system bus or other data and command transfer system that couples the various components within the device. A system bus can include any one or combination of different bus structures and architectures, as well as control and data lines.

The device 600 also includes computer-readable storage memory devices 610 that enable data storage, such as data storage devices that can be accessed by a computing device, and that provide persistent storage of data and executable instructions (e.g., software applications, programs, functions, and the like). Examples of the computer-readable storage memory devices 610 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory device 610 provides data storage mechanisms to store the device data 612, other types of information or data, and various device applications 614 (e.g., software applications). For example, an operating system 616 can be maintained as software instructions with a memory device and executed by the processing system 606. The device applications 614 may also include a device manager, such as any form of a control application, software application, signal-processing and control module, code that is native to a particular device, a hardware abstraction layer for a particular device, and so on.

The device 600 can also include one or more device sensors 618, such as any one or more of an ambient light sensor, a proximity sensor, a touch sensor, an infrared (IR) sensor, accelerometer, gyroscope, thermal sensor, audio sensor (e.g., microphone), and the like. The device 600 can also include one or more power sources 620, such as when the device 600 is implemented as a mobile device. The power sources 620 may include a charging or power system, and can be implemented as a flexible strip battery, a rechargeable battery, a charged super-capacitor, or any other type of active or passive power source.

The device 600 additionally includes an audio or video processing system 622 that generates one or both of audio data for an audio system 624 and display data for a display system 626. In accordance with some embodiments, the audio/video processing system 622 is configured to receive call audio data from the transceiver 604 and communicate the call audio data to the audio system 624 for playback at the device 600. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for updating lens focus calibration values have been described in language specific to features or methods, the subject of the appended claims is not necessarily limited to the specific features or methods described. Rather, the specific features and methods are disclosed as example implementations of techniques for implementing updating lens focus calibration values. Further, various different embodiments are described, and it is to be appreciated that each described embodiment can be implemented independently or in connection with one or more other described embodiments. Additional aspects of the techniques, features, and/or methods discussed herein relate to one or more of the following.

In some examples, the techniques described herein relate to a method including: collecting multiple sets of data points, each set of data points including an indication of a distance from a lens of a camera system to an object and an indication of a location of the lens of the camera system relative to an image sensor of the camera system; determining, by analyzing the multiple sets of data points, at least one lens focus calibration value for an object distance from the lens of the camera system to the object; checking whether the determined at least one lens focus calibration value differs from a corresponding stored lens focus calibration value by at least a threshold amount; and updating, in response to the at least one lens focus calibration value differing from the corresponding stored lens focus calibration value by at least the threshold amount, the stored lens focus calibration value with the determined at least one lens focus calibration value.

In some examples, the techniques described herein relate to a method, the indication of the distance including a reciprocal of the distance to the object.

In some examples, the techniques described herein relate to a method, the indication of the location of the lens of the camera system relative to the image sensor including a voice coil motor code indicating a position of a voice coil motor coupled to the lens.

In some examples, the techniques described herein relate to a method, the determining including identifying a linear curve fitting the multiple sets of data points.

In some examples, the techniques described herein relate to a method, the determining including determining, from the linear curve, a first lens focus calibration value that is a first actuator code at a macro distance from the lens of the camera system to the object and a second lens focus calibration value that is a second actuator code at an infinity distance from the lens of the camera system to the object.

In some examples, the techniques described herein relate to a method, the at least one lens focus calibration value including an actuator value at a macro distance from the lens of the camera system to the object.

In some examples, the techniques described herein relate to a method, the corresponding stored lens focus calibration value including a stored actuator value for the macro distance from the lens of the camera system to the object.

In some examples, the techniques described herein relate to a method, the at least one lens focus calibration value including an actuator value at an infinity distance from the lens of the camera system to the object.

In some examples, the techniques described herein relate to a method, the corresponding stored lens focus calibration value including a stored actuator value for the infinity distance from the lens of the camera system to the object.

In some examples, the techniques described herein relate to a computing device including: a camera system including a lens and an image sensor; a processor implemented in hardware; and a computer-readable storage medium having stored thereon multiple instructions that, responsive to execution by the processor, cause the processor to perform acts including: collecting multiple sets of data points, each set of data points including an indication of a distance from the lens of the camera system to an object and an indication of a location of the lens of the camera system relative to the image sensor of the camera system; determining, by analyzing the multiple sets of data points, at least one lens focus calibration value for an object distance from the lens of the camera system to the object; checking whether the determined at least one lens focus calibration value differs from a corresponding stored lens focus calibration value by at least a threshold amount; and replacing, in response to the at least one lens focus calibration value differing from the corresponding stored lens focus calibration value by at least the threshold amount, the stored lens focus calibration value with the determined at least one lens focus calibration value.

In some examples, the techniques described herein relate to a computing device, for each set of data points the indication of the location of the lens of the camera system relative to the image sensor including an actuator setting indicating a position of an actuator coupled to the lens, the acts further including, for each set of data points, generating a reciprocal of the distance to the object, and analyzing the actuator settings and the reciprocals of the distances to the object to identify a linear curve fitting the multiple sets of data points.

In some examples, the techniques described herein relate to a computing device, the determining including determining, from the linear curve, a first lens focus calibration value that is a first actuator setting at a macro distance from the lens of the camera system to the object and a second lens focus calibration value that is a second actuator setting at an infinity distance from the lens of the camera system to the object.

In some examples, the techniques described herein relate to a computing device, the at least one lens focus calibration value including an actuator value at a macro distance from the lens of the camera system to the object, and the corresponding stored lens focus calibration value including a stored actuator value for the macro distance from the lens of the camera system to the object.

In some examples, the techniques described herein relate to a computing device, the at least one lens focus calibration value including an actuator value at an infinity distance from the lens of the camera system to the object and the corresponding stored lens focus calibration value including a stored actuator value for the infinity distance from the lens of the camera system to the object.

In some examples, the techniques described herein relate to a system including: calibration value determination module, implemented at least in part in hardware, to collect multiple sets of data points, each set of data points including an indication of a distance from a lens of a camera system to an object and an indication of a location of the lens of the camera system relative to an image sensor of the camera system, and to determine, by analyzing the multiple sets of data points, at least one lens focus calibration value for an object distance from the lens of the camera system to the object; and a calibration value update module, implemented at least in part in hardware, to check whether the determined at least one lens focus calibration value differs from a corresponding stored lens focus calibration value by at least a threshold amount, and to replace, in response to the at least one lens focus calibration value differing from the corresponding stored lens focus calibration value by at least the threshold amount, the stored lens focus calibration value with the determined at least one lens focus calibration value.

In some examples, the techniques described herein relate to a system, the at least one lens focus calibration value including an actuator value at a macro distance from the lens of the camera system to the object, and the corresponding stored lens focus calibration value including a stored actuator value for the macro distance from the lens of the camera system to the object.

In some examples, the techniques described herein relate to a system, the at least one lens focus calibration value including an actuator value at an infinity distance from the lens of the camera system to the object and the corresponding stored lens focus calibration value including a stored actuator value for the infinity distance from the lens of the camera system to the object.

In some examples, the techniques described herein relate to a system, the indication of the location of the lens of the camera system relative to the image sensor including a voice coil motor code indicating a position of a voice coil motor coupled to the lens.

In some examples, the techniques described herein relate to a system, the analyzing the multiple sets of data points including identifying a linear curve fitting the multiple sets of data points.

In some examples, the techniques described herein relate to a system, the analyzing the multiple sets of data points including determining, from the linear curve, a first lens focus calibration value that is a first actuator code at a macro distance from the lens of the camera system to the object and a second lens focus calibration value that is a second actuator code at an infinity distance from the lens of the camera system to the object.

What is claimed is:

1. A method comprising:
    collecting multiple sets of data points, each set of data points including an indication of a distance from a lens of a camera system to an object and an indication of a location of the lens of the camera system relative to an image sensor of the camera system;
    determining, by analyzing the multiple sets of data points, at least one lens focus calibration value for an object distance from the lens of the camera system to the object;
    checking whether the determined at least one lens focus calibration value differs from a corresponding stored lens focus calibration value by at least a threshold amount;
    updating, in response to the at least one lens focus calibration value differing from the corresponding stored lens focus calibration value by at least the threshold amount, the stored lens focus calibration value with the determined at least one lens focus calibration value; and
    changing, based at least in part on the at least one lens focus calibration value, a distance between the image sensor and the lens.

2. The method of claim 1, the indication of the distance including a reciprocal of the distance to the object.

3. The method of claim 1, the indication of the location of the lens of the camera system relative to the image sensor including a voice coil motor code indicating a position of a voice coil motor coupled to the lens.

4. The method of claim 1, the determining including identifying a linear curve fitting the multiple sets of data points.

5. The method of claim 4, the determining including determining, from the linear curve, a first lens focus calibration value that is a first actuator code at a macro distance from the lens of the camera system to the object and a second lens focus calibration value that is a second actuator code at an infinity distance from the lens of the camera system to the object.

6. The method of claim 1, the at least one lens focus calibration value including an actuator value at a macro distance from the lens of the camera system to the object.

7. The method of claim 6, the corresponding stored lens focus calibration value including a stored actuator value for the macro distance from the lens of the camera system to the object.

8. The method of claim 1, the at least one lens focus calibration value including an actuator value at an infinity distance from the lens of the camera system to the object.

9. The method of claim 8, the corresponding stored lens focus calibration value including a stored actuator value for the infinity distance from the lens of the camera system to the object.

10. A computing device comprising:
    a camera system including a lens and an image sensor;
    a processor implemented in hardware; and
    a computer-readable storage medium having stored thereon multiple instructions that, responsive to execution by the processor, cause the processor to perform acts including:
        collecting multiple sets of data points, each set of data points including an indication of a distance from the lens of the camera system to an object and an indication of a location of the lens of the camera system relative to the image sensor of the camera system;
        determining, by analyzing the multiple sets of data points, at least one lens focus calibration value for an object distance from the lens of the camera system to the object;

checking whether the determined at least one lens focus calibration value differs from a corresponding stored lens focus calibration value by at least a threshold amount;

replacing, in response to the at least one lens focus calibration value differing from the corresponding stored lens focus calibration value by at least the threshold amount, the stored lens focus calibration value with the determined at least one lens focus calibration value; and changing, based at least in part on the at least one lens focus calibration value, a distance between the image sensor and the lens.

11. The computing device of claim 10, for each set of data points the indication of the location of the lens of the camera system relative to the image sensor including an actuator setting indicating a position of an actuator coupled to the lens, the acts further including, for each set of data points, generating a reciprocal of the distance to the object, and analyzing the actuator settings and the reciprocals of the distances to the object to identify a linear curve fitting the multiple sets of data points.

12. The computing device of claim 11, the determining including determining, from the linear curve, a first lens focus calibration value that is a first actuator setting at a macro distance from the lens of the camera system to the object and a second lens focus calibration value that is a second actuator setting at an infinity distance from the lens of the camera system to the object.

13. The computing device of claim 10, the at least one lens focus calibration value including an actuator value at a macro distance from the lens of the camera system to the object, and the corresponding stored lens focus calibration value including a stored actuator value for the macro distance from the lens of the camera system to the object.

14. The computing device of claim 10, the at least one lens focus calibration value including an actuator value at an infinity distance from the lens of the camera system to the object and the corresponding stored lens focus calibration value including a stored actuator value for the infinity distance from the lens of the camera system to the object.

15. A system comprising:

calibration value determination module, implemented at least in part in hardware, to collect multiple sets of data points, each set of data points including an indication of a distance from a lens of a camera system to an object and an indication of a location of the lens of the camera system relative to an image sensor of the camera system, and to determine, by analyzing the multiple sets of data points, at least one lens focus calibration value for an object distance from the lens of the camera system to the object;

a calibration value update module, implemented at least in part in hardware, to check whether the determined at least one lens focus calibration value differs from a corresponding stored lens focus calibration value by at least a threshold amount, and to replace, in response to the at least one lens focus calibration value differing from the corresponding stored lens focus calibration value by at least the threshold amount, the stored lens focus calibration value with the determined at least one lens focus calibration value; and a camera system, implemented at least in part in hardware, to capture, based at least in part on the at least one lens focus calibration value, an image.

16. The system of claim 15, the at least one lens focus calibration value including an actuator value at a macro distance from the lens of the camera system to the object, and the corresponding stored lens focus calibration value including a stored actuator value for the macro distance from the lens of the camera system to the object.

17. The system of claim 16, the at least one lens focus calibration value including an actuator value at an infinity distance from the lens of the camera system to the object and the corresponding stored lens focus calibration value including a stored actuator value for the infinity distance from the lens of the camera system to the object.

18. The system of claim 15, the indication of the location of the lens of the camera system relative to the image sensor including a voice coil motor code indicating a position of a voice coil motor coupled to the lens.

19. The system of claim 15, the analyzing the multiple sets of data points including identifying a linear curve fitting the multiple sets of data points.

20. The system of claim 19, the analyzing the multiple sets of data points including determining, from the linear curve, a first lens focus calibration value that is a first actuator code at a macro distance from the lens of the camera system to the object and a second lens focus calibration value that is a second actuator code at an infinity distance from the lens of the camera system to the object.

* * * * *